Feb. 27, 1962 R. E. HANSLIP 3,022,992
TORSION SPRING UNIT
Filed Oct. 13, 1958 2 Sheets-Sheet 1
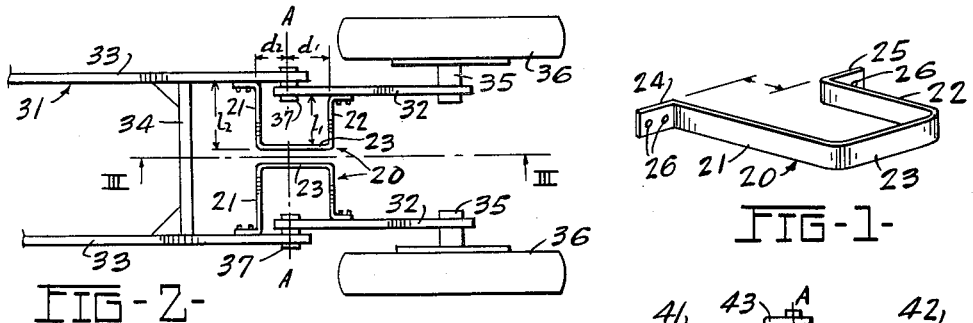
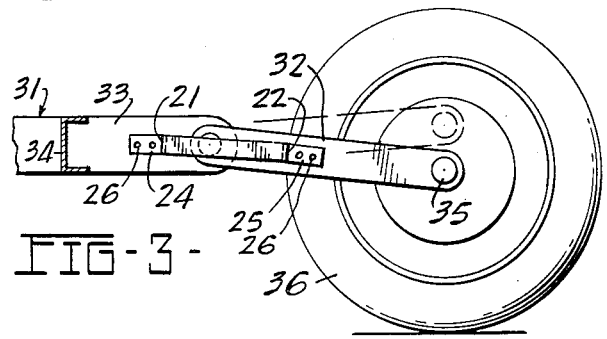
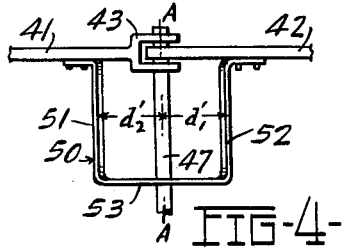
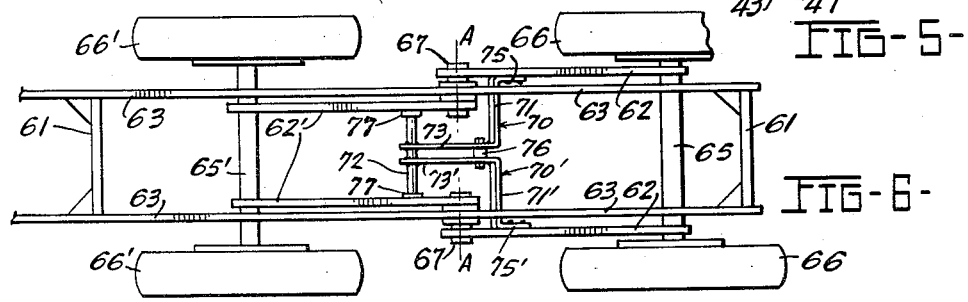
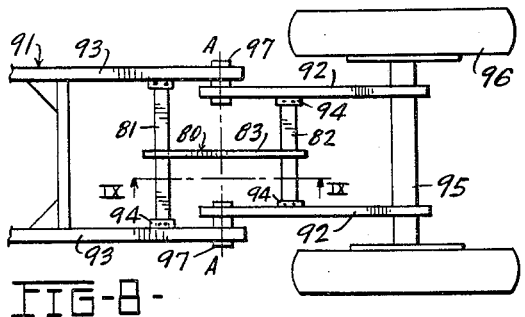
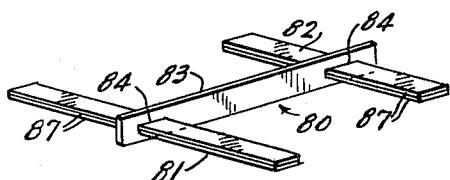
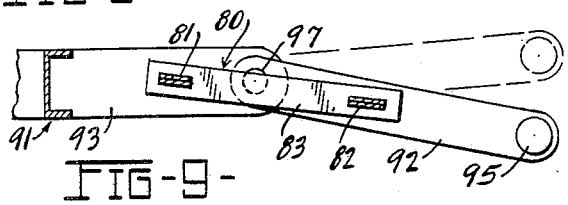
INVENTOR:
RICHARD E. HANSLIP.
BY
Hugh A Kirk
ATT'Y.

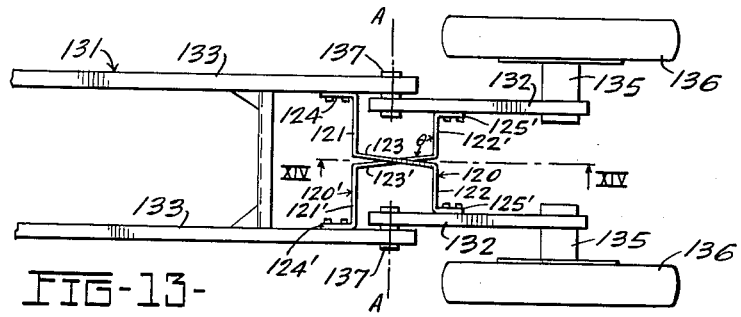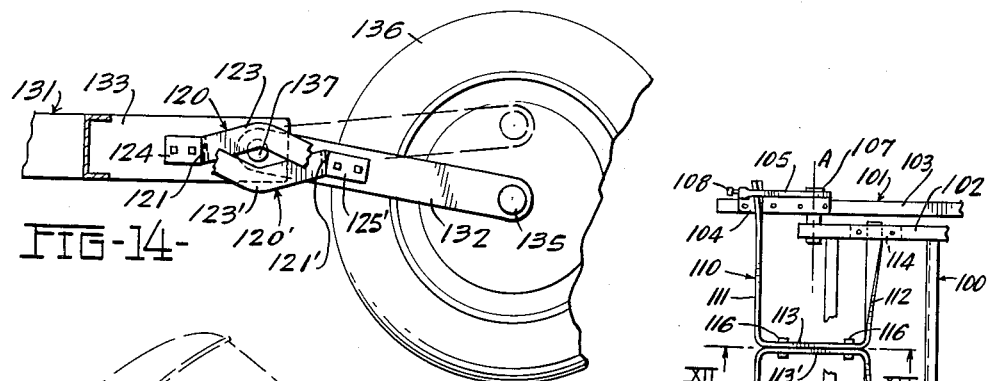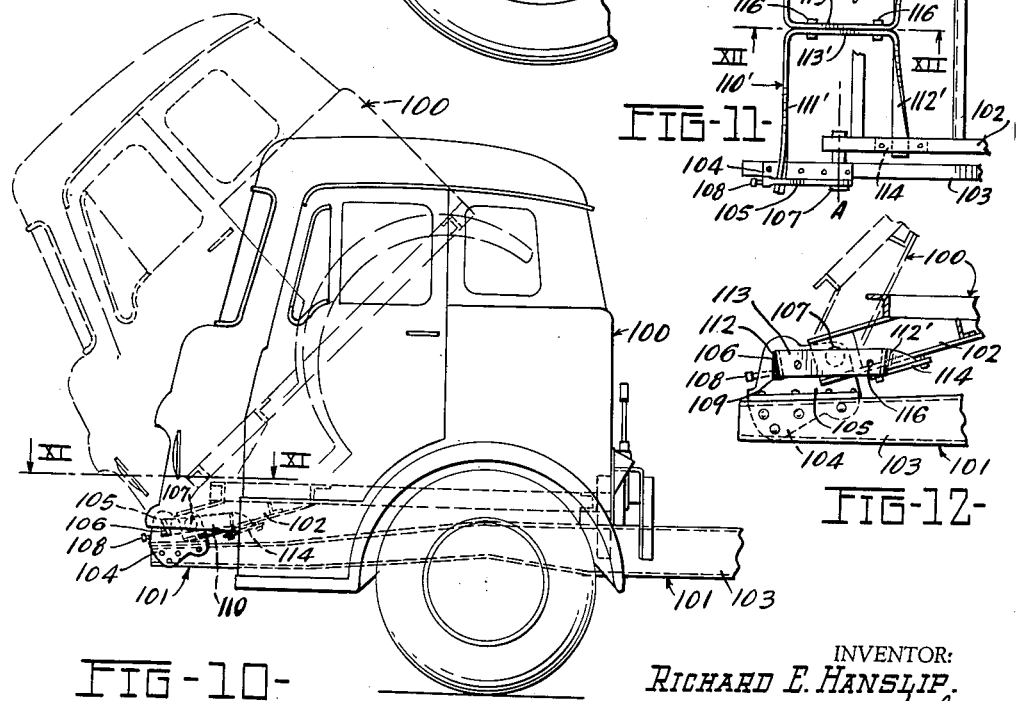

United States Patent Office 3,022,992
Patented Feb. 27, 1962

3,022,992
TORSION SPRING UNIT
Richard E. Hanslip, Toledo, Ohio, assignor to Mather Spring Co., Toledo, Ohio, a corporation of Ohio
Filed Oct. 13, 1958, Ser. No. 766,796
28 Claims. (Cl. 267—57)

This invention relates to a new type of torsion spring. More particularly, it deals with such a spring for restricting the movement between two relatively movable members pivoted about an axis, such as for example between a frame and the pivoted arm supporting the wheel or wheels of a vehicle, or the cab and the frame of a tilting cab truck.

Previously, torsion springs which would both be sufficiently strong and flexible for use in vehicles needed o be so long that they often required more space than could be provided for them. Thus they often could not be mounted longitudinal of the axis of relative movement between the members to which they were attached and had to be mounted on separate levers attached to the members, and placed lengthwise of the vehicle.

Accordingly it is an object of this invention to produce a new, efficient, simple, effective, economic and compact torsion spring unit to restrict movement between two pivotally movable members.

Another object is to provide a torsion spring unit which may be used off the center line of the axis of rotation of the two members whose movement it is to restrict, such as for hinged joints in which the hinge occupies substantially all of the available space along the axis, leaving little if any place for a torsion spring.

Another object is to provide such a torsion spring unit which is simple to manufacture, easy to install and may be made out of one piece of material.

Another object is to provide such a torsion spring unit in which the torsional stresses are not carried throughout the entire length of the spring.

Another object is to provide such a torsion spring unit made out of one piece of material which has at least two substantially right angle bends therein, and may have more such bends for its anchors.

Generally speaking, this invention comprises a torsion spring unit composed of two spaced longitudinal torsion elements connected together by a torque transfer element and means for anchoring the torsion element to the two pivoted members whose relative rotational movement is to be restricted by the unit. The two elongated torsion elements are preferably substantially parallel to each other and the pivoted axis of the members and are located on opposite sides of said pivotal axis so that the transfer element traverses said axis. This torsion spring unit may have a U, H or Z shaped form in which the two legs relatively parallel with each other form the two torsion elements of the spring unit, and the connecting member may comprise the relatively rigid transfer element between the two springs.

It is important that the torque developed due to twist in each of the two torsion elements of the unit is substantially equal, so as to reduce the bending stresses in the torsion elements. Thus if the two torsion elements are made out of the same material and have the same polar moment of inertia, the length of one of the torsion elements times its distance from the axis of rotation must be equal to the length of the other element times its distance from said axis. Correspondingly, if the elements are of the same length, their distances from the pivotal axis are equal, and if one element is longer than the other, the longer element must correspondingly be located closer to the axis than the other and shorter element. On the other hand, if the two torsion elements of the unit have different torsional resistance, i.e. are of different materials and/or cross-sectional areas and/or have different polar moments of inertia, so that one is stiffer than the other, the stiffer one will correspondingly be placed farther from the axis of rotation than that of the less stiff one. Applying this generally to such a U-shaped torsion spring unit wherein the lengths of the shorter and longer torsion elements are designated as $l_1$ and $l_2$, respectively, and their distances from their pivotal axis are $d_1$ and $d_2$, and the shearing moduli of the elements are $E_1$ and $E_2$, and the effective polar moments of inertia of the elements are $I_1$ and $I_2$, respectively, then their mathematical relationship must satisfy the following formula:

$$\frac{d_1}{d_2} = \frac{l_2 E_1 I_1}{l_1 E_2 I_2}$$

Although it is not essential that the two longitudinal torsion elements of the torsion spring unit lie in the same plane with the axis of rotation between the two members whose rotational movement they are to restrict, it is advantageous under normal operation that they substantially do lie in the same plane, and that the distance between the two elements remains substantially the same at all times, although under large angular deflections such is not exactly true. In this regard it should be noted that the farther away from the plane of both the axis and one of the torsion elements the other torsion element moves, or the more the change in the direct distance between the two torsion elements themselves, the more bending or flexural stresses are placed in the transfer element as well as in the torsion elements. Nevertheless, for normal operations such as the relative movements between the arms supporting a wheel and the frame of the vehicle, these relative angular displacements between the pivoted members will not exceed about 90° and usually less than about 45°, i.e. 22½° either side of center, under which conditions the bending or flexural stresses in the transfer element are comparatively small and may be ignored, particularly if the transfer element is made sufficiently rigid so as to be relatively unaffected by these stresses and act as a constant moment beam transmitting the torque from one torsion element to the other. Accordingly, the transfer element may be substantially rigid with respect to the twist of the torsion elements connected to it.

The above mentioned and other features and objects of the invention and the manner of attaining them will become more apparent and the invention itself will be best understood by reference to the following description of embodiments of the invention taken in conjunction with the accompanying drawings, wherein:

FIG. 1 is a perspective view of one embodiment of a one piece U-shaped torsion spring unit constructed in accordance with the present invention;

FIG. 2 is a schematic partial plan view of a vehicle chassis with separate wheel suspensions employing two of the spring units of FIG. 1;

FIG. 3 is an enlarged longitudinal vertical section taken along the line III—III of FIG. 2;

FIG. 4 is a schematic plan view of an embodiment of a symmetrical U-shaped torsion spring unit with an arced transfer element connecting to a pair of aligned pivoted members;

FIG. 5 is an end elevational view of FIG. 4 showing are arced transfer element bridging the shaft pivoting the two aligned members;

FIG. 6 is a schematic partial plan view of a vehicle chassis supported by tandem axles and employing one form of an H-shaped torsion spring unit according to another embodiment of this invention;

FIG. 7 is a perspective view an another embodiment of an H-shaped form of the spring unit according to this invention;

FIG. 8 is a schematic partial plan view of a vehicle chassis and wheel suspension utilizing the spring unit of FIG. 7;

FIG. 9 is an enlarged longitudinal vertical section taken along the line IX—IX of FIG. 8;

FIG. 10 is a partial side elevational view of a tiltable cab truck chassis, showing in dotted lines the cab in a tilted position relative to the chassis;

FIG. 11 is a plan sectional view taken along the line XI—XI of FIG. 10 and showing an H-shaped form of torsion spring unit made of two U-shaped units as shown in FIG. 1 and used to counterbalance the tiltable cab on the chassis;

FIG. 12 is an enlarged vertical section taken along the line XII—XII of FIG. 11;

FIG. 13 is a schematic partial plan view of a vehicle chassis and wheel suspension employing two Z-shaped forms of the spring units according to a further embodiment of this invention; and FIG. 14 is a longitudinal vertical section taken along the line XIV—XIV of FIG. 13.

U-Shaped Springs

With reference now to the drawings and particularly to FIG. 1, the novel torsion spring unit 20 of the invention there shown is substantially U-shaped in plan view and has the torsion elements thereof comprising spaced, substantially parallel legs 21 and 22 of unequal length and a constant moment beam portion comprising a connecting, bridging or torque transfer element 23 connecting the legs 21 and 22 and disposed substantially at right angles thereto. However, the transfer element may be formed at any radius bend with the torsion elements even to a continuous semi-circular curved strap section joining the two parallel torsion elements 21 and 22 without departing from the scope of this invention. The legs 21 and 22 may be provided with integral flanges 24 and 25 which may have openings 26 formed therein through which bolts or the like may be inserted to anchor the spring unit.

For economy of construction, the spring unit 20 is formed of a single piece of bar metal of constant rectangular cross-section bent to the configuration shown in FIG. 1. In this embodiment each bend in the bar is made at substantially a 90° angle including the junction point of the transfer or bridging member 23 with the legs 21 and 22, since it is desirable that any twist of one of the legs be transmitted to the bridging member as a torque or end moment which is resisted by an equal torque or end moment afforded by the torsional resistance of the opposite leg.

By forming the spring unit of a single piece of bar metal of constant cross sectional area and having the neutral axis of each of the various component members of the spring lie in a common plane, loads or stresses are not eccentric to any given member. Also by forming the spring unit in such a fashion that the bends are about axes parallel to the major or widest surface of the bar, the bridging member or transfer element, when the spring is in use, has its greatest section modulus available to resist the bending moment it must transmit from one torsion element or leg to the other.

In FIGS. 2 and 3 two of the novel spring units 20 of FIG. 1 are used as a springing medium between an automobile chassis 31 and a pair of separately suspended trailing arms 32 of an automobile wheel suspension. It will be understood of course that the actual details of a wheel suspension are not necessary to an understanding of the invention and thus the drawings are only in diagrammatic form with the automobile chassis being shown as comprising spaced rigid channels 33 connected to one another by a cross channel 34. The rear wheel assembly is shown as comprising a pair of independent, spaced trailing arms 32 connected at their outermost ends to stub axles 35 which support a pair of wheels 36. Each of the arms 32 is spaced inwardly from its adjacent channel 33 and is pivotally connected on pins 37 at its innermost end for movement relative thereto about a pivotal axis defined by the center line A—A.

As previously pointed out, the present invention contemplates that a spring of one piece construction be capable of providing the torsional resistance afforded by a pair of independent torsion elements. Thus as shown in FIG. 2 the spring units 20 have their legs 21 and 22 extending parallel to the axis A—A and their transfer elements 23 disposed transversely and at right angles to the axis A—A. Since the trailing arms 32 are offset toward the springs 20, the legs 22 connected thereto are necessarily shorter than the legs 21 connected to the frame 33. Therefore, equal torque in each spring leg or torsion element 21 and 22 is provided by positioning the spring relative to the pivotal axis so that the length $l_1$ of the shorter leg 22 multiplied by its distance $d_1$ to the pivotal axis A—A equals the length $l_2$ of the longer leg 21 multiplied by its distance $d_2$ to the pivotal axis A—A.

In FIGS. 4 and 5 there is shown a pair of axially aligned arms or members 41, 42 with the member 41 having a bifurcated end 43 for receiving the member 42. The adjacent ends of the members are provided with axial openings through which an axle 47 may be inserted so that the members 41 and 42 may be moved relative to one another. Connecting the two members 41 and 42 is a torsion spring unit 50 having its legs or torsion elements 51 and 52 of equal length since the members 41 and 42 are shown in alignment with each other. Since the axle 47 and torsion elements 51 and 52 are all located in substantially the same plane, in order to clear the axle 47, the bridging member or constant moment beam 53 may be bent out of that plane (see FIG. 5) as well as disposed at right angles to both the pivotal axis A—A and also the torsion elements 51 and 52 which extend parallel to the axis. Since these elements 51 and 52 are of equal length, in order that each equally resists the torsion that would be produced by moving one of the members 41 relative to the other 42, the distance $d'_2$ from the torsion element 51 to the axis A—A equals the distance $d'_1$ from the torsion element 42 to the axis A—A. Thus, the spring unit 50 shown in FIG. 4 is symmetrically located with respect to the pivotal axis A—A and has equal torsional stresses set up in each of its parallel torsion elements when a member to which it is connected is moved.

H-Shaped Springs

There is shown in FIG. 6 a typical assembly for a vehicle having tandem rear axles 65, 65' and the chassis 61 of which includes a pair of spaced channels 63 which support a pair of wheel assemblies, one of which comprises a first pair of spaced trailing arms 62 located outwardly of the channels 63 and supporting the axle 65 and wheels 66, and a second pair of spaced arms 62' each of which is located between the channels 63 supporting the second axle 65' and wheels 66'. Each of the individual legs 62 and 62' is pivotally mounted adjacent its end remote from the axles 65 and 65' for movement relative to the channels about the stub axles 67 on a common axis defined by the center line A—A.

Between the relatively movable pairs of arms 62 and 62' an H-shaped torsion spring unit according to this invention is disclosed in which one of the torsion elements comprises one of the legs 71, 71' of each of two complementarily disposed L-shaped strap members 70 and 70' anchored by flanges 75, 75' to the arms 62, while the other adjacent legs 73 and 73' of these L-shaped members 70, 70' form the transfer element of the torsion spring unit assembly and are anchored at their outer ends near the center of a separate round, square or other cross-sectional torsion bar element 72. The opposite ends of this bar 72 may be attached by anchor means 77 onto the other two arms 62'. The axis A—A of axles 67 is shown in FIG. 6 to be located closer to the torsion element legs 71, 71' of the L-shaped strap portions 70, 70', since together these legs are shown to be longer than the torsion bar 72. If desired, the two adjacent transfer elements 73, 73' may also be bolted together adjacent the bends in their legs such as by a bolt or rivet 76.

The H-shaped spring unit 70, 70' of FIG. 6 will not, of course, provide the same degree of relative movement between the pair of trailing legs 62 or 62' as is provided by the separate spring units 20 in FIG. 2 wherein the individual wheels 36 are independently mounted and are free to move in a vertical plane relative to one another. When the H-shaped spring unit 70, 70' is used, the movement of one trailing leg 62 or 62' would necessarily impart torsional stresses to the entire spring unit 70, 70'. If such an H-shaped unit were employed in the independently mounted wheel suspension of FIG. 2, the attached aligned torsion elements between the legs 32 would also act as a stabilizer between the wheels 36.

A further modification of the novel spring of the invention is shown in FIGS. 7 to 9 with the spring unit 80 there shown being generally H-shaped in plan and used with the same type of assemblage as is shown in FIG. 2. The spring unit 80 (see FIG. 7) comprises spaced parallel legs 81 and 82 each of which comprises a plurality of flat rectangular metal bars, plates or strips 87 in contact with one another. The bridging or constant moment transfer element or member comprises a plate 83 disposed with its major surface at right angles to the major surface of the plates forming two legs 81 and 82 and is provided at each of its opposite ends with elongated slots 84 which receive the legs therethrough. Preferably, the width of the slots 84 as well as the length thereof is sufficient to just allow the bars 87 of the legs 81 or 82 to fit therein thus providing a relatively rigid joint between the bridging member 83 and the legs or torsion elements 81 and 82.

In use and as shown in FIGS. 8 and 9, the spring unit 80 has its legs 81 and 82 straddling the axis A—A about which the channels 93 of chassis 91 and trailing arms 92 are mounted on aligned pivots 97 for movement relative to one another. The longer leg 81 is secured to the channels 93 and the shorter leg 82 to the trailing arms 92 supporting an axle 95 with wheels 96. Each leg 81 and 82 extends substantially parallel to the axis A—A. Any suitable mounting means may be used to secure the respective legs or torsion elements to the channels and trailing arms. By way of example, the torsion element legs of the spring unit 80 may be merely bolted to flat plates 94 extending inwardly from the members 93 and 92.

By forming the legs 81 and 82 of a pair of plates 87, the spring unit 80 is able to withstand a considerably greater torque or torsional load than a single strap spring unit of the type shown in FIG. 1. By positioning the member 83 with its major surface at right angles to that of the bars 87 in the legs 81 and 82 its maximum section modulus is available to resist the torque imparted thereto by said legs or torsion elements 81 and 82.

As was the case with the previous forms of spring units described, the spring unit 80 is preferably positioned relative to its axis A—A so that the length of the longer leg 81 multiplied by its distance along the bridging member 83 to the pivotal axis A—A equals the length of the shorter leg 82 multiplied by its distance along the bridging member 83 to the pivotal axis A—A. When the spring is thus located, equal torsional loads are created in each leg 81 and 82 when the members 93 and 92 are moved relatively to each other.

In FIGS. 10, 11 and 12 there is shown another embodiment or form of a torsion spring unit constructed in accordance with the present invention and used as a counter-balance spring between the chassis frame 101 and the cab frame 100 of a truck having a cab adapted to tilt forwardly relative to the chassis. The truck chassis includes spaced channels 103 having mounted on the uppermost flange thereof adjacent their outermost ends a pair of hinge brackets 104 including vertically positioned plates 105 each of which has a pie-shaped or trapezoidal opening 106 formed therein which, as will be later described, receives one of the legs of an H-shaped spring unit 110, 110' (see FIG. 11). The hinge brackets 104 serve to support a cab frame 100 which includes spaced channels 102 mounted for movement relative to the chassis channels and hinge brackets by means of a pair of stub shafts 107 secured thereto so that the cab frame is free to rotate relative to the chassis about the axis A—A to the position shown in dotted lines in FIG. 10 or 12.

The torsion spring unit 110, 110' shown in FIG. 11 is similar to a pair of U-shaped units 20 as shown in FIG. 1 in back-to-back contacting relationship having their bridging members 113, 113' anchored together such as by rivets or bolts 116, and their respective torsion elements 111, 111', 112, 112' connected to the adjacent frame channels 103 and 102, respectively. The spring unit 110, 110' may not be provided with flanges for securing the torsion elements or legs thereof to their movable members but instead the ends of the longer pair of legs 111, 111' may be mounted in the pie-shaped slots 106 in the brackets 104 on the frame, and the ends of the shorter pair of legs 112, 112' may be clamped by plates 114 to the lower flange of the channels 102. These torsion legs 111, 111', 112, 112' are shown in their full line positions in FIGS. 10, 11 and 12 as being twisted about 90° with respect to each other because when the cab 100 is down the unit 110 is under torsion to counterbalance the weight of the cab so it will be easier to tilt upwardly. To fixedly maintain the ends of the legs 111, 111' within the slots 106 and secured to the plates 104, a cap screw 108 (see FIG. 12) may be provided and mounted for movement in the plane of each plate 105 so that the end thereof may be advanced into the pie-shaped opening 106 and into contact with a cushion or plate 109 contacting the surface of the leg 111, or 111' thus gripping the leg between said cushion 109 and the adjacent edge of the pie-shaped slot 106. These screws 108 also permit adjustability of the torsion in the spring unit 110. This spring unit 110 also is positioned relative to its axis A—A so that the effective length of the legs 111, 111' multiplied by their transverse distance to the axis A—A equals the effective length of the shorter legs 112, 112' multiplied by their transverse distance to the axis A—A.

*Z-Shaped Springs*

A still further embodiment of the spring unit of the invention is shown in FIGS. 13 and 14 and may be used with a chassis and rear wheel suspension of the type shown in FIG. 2, 6 or 8. The novel spring unit 120 or 120' operates on the same principle as those previously discussed except that it is shaped in the form of a Z with the longer legs 121, 121' thereof connected to a chassis 131 having channels 133 and the shorter oppositely disposed legs 122, 122' connected to the separate trailing arms 132 supporting axles 135 and wheels 136 and pivoted on pins 137 about the opposite channels 133. The two legs or torsion elements 121 or 121' and 122 or 122' are connected by a bridging member 123 or 123', respectively, with the interior angle θ between the bridging member and each leg being somewhat greater than 90° so that, as shown in FIG. 13, when a pair of springs 120, 120' is used in a modified H form of construction, the bridging members 123, 123' of each may clear one another when the respective members or arms 132 move relative to one another (see FIG. 14). Further for this purpose, the leg 121 of the spring 120 may be bent upwardly relative to its connecting flange 124 as well as the bridging member 123 being arced upwardly. The same thing is true in reverse with the leg 121' and bridging member 123' of the spring 120' so that movement of one trailing leg 132 independently and relative to the other may be accommodated. In order to have the torsional loads equal in each spring leg 121 and 122 or 121' and 122', the spring units 120 and 120' straddle the axis A—A and lie substantially all in the same plane so that the length of the leg 121 multiplied by its shortest distance, to the axis A—A equals the length of the leg 122 multiplied by its shortest distance to said axis.

The foregoing description of the novel spring units of this invention and their usage in joining together a pair of members which are pivotally movable relative to one another, not only illustrates the present invention as providing a torsion spring of novel construction but also includes the use of the spring in a novel manner whereby maximum torsional resistance may be afforded with a minimum of material. Although in most illustrated embodiments of the invention the spring is shown as formed of a single bar of metal, it will be understood that the spring component elements may be formed separately of round, square, hexagonal or of other shape stock or materials and then joined or anchored together without detracting from the usefulness of the spring unit. However, the two torsion elements in each spring unit must have near equal torque developed in them due to twisting.

While there is described above the principles of this invention in connection with specific apparatus, it is to be clearly understood that this description is made only by way of example and not as a limitation to the scope of this invention.

What is claimed is:

1. A supporting frame and a member pivotally attached to said frame and movable relative to said frame about a single axis, a torsion spring unit straddling said axis, comprising: first and second elongated torsion elements located in the same plane with said axis between the extremes of relative movement between said frame and said member, said extremes being 45° each side of said plane, one of said torsion elements having one of its ends connected to said frame and the other of said torsion elements having one of its ends connected to said member, and a constant moment beam element disposed transversely to said axis and rigidly connected to and spaced from said one end of each of said torsion elements.

2. The structure according to claim 1 wherein said elements of said torsion spring unit are distinct from each other.

3. The structure according to claim 1 wherein the distance perpendicular to said axis to said one end of one of said torsion elements is substantially equal to the distance perpendicular to said axis to the connection of said one torsion element to said constant moment beam element.

4. The structure according to claim 1 wherein said torsion elements are of the same material having the same cross sectional area and have lengths so that the length of one torsion element multiplied by its distance to said axis substantially equals the length of the other torsion element multiplied by its distance to said axis.

5. The structure according to claim 1 wherein said torsion spring unit is substantially U shaped, with said torsion elements comprising the legs of the U and said constant moment beam element comprising the base of the U.

6. The structure according to claim 1 wherein said torsion elements extend substantially parallel to said axis and said constant moment beam element is disposed substantially at right angles to said axis.

7. The structure according to claim 1 wherein said torsion spring unit is formed of a single flat metal bar.

8. The structure according to claim 1 wherein said torsion elements comprise a plurality of flat bars.

9. The structure according to claim 1 wherein said constant moment beam element comprises a flat bar having slots formed in opposite ends thereof, and said torsion elements are flat bars carried within said slots.

10. The structure according to claim 9 wherein each torsion element comprises a plurality of flat bars in contact with one another.

11. The structure according to claim 1 wherein the torsion spring unit is in the form of an H with said torsion elements comprising the legs of the H and with said constant moment beam element comprising the cross piece of the H.

12. The structure according to claim 1 wherein said torsion elements extend in opposite directions from said constant moment beam element.

13. A supporting frame and a member pivotally attached to said frame and movable relative to said frame about a single axis, said member being spaced axially along said axis with respect to said frame, a U shaped torsion spring unit straddling said axis, comprising: first and second elongated torsion elements of unequal twist resistance corresponding to the legs of the U and being located in the same plane with said axis between the extremes of relative movement between said frame and said member, said extremes being 45° each side of said plane, one of said torsion elements having one of its ends connected to said frame and the other of said torsion elements having one of its ends connected to said member, and a constant moment beam element corresponding to the base of the U and disposed transversely to said axis and rigidly connected to and spaced from said one end of each of said torsion elements.

14. A supporting frame member and a lever member pivotally attached to said frame member and movable relative to said frame member about a single axis, a torsion spring unit straddling said axis, comprising: first and second elongated torsion elements located in the same plane with said axis between the extremes of relative movement between said members, said extremes being 45° each side of said plane, means for connecting one of the ends of one of said torsion elements to said frame member, means for connecting one of the ends of the other of said torsion elements to said lever member, and a constant moment beam element disposed transversely to said axis and rigidly connected to and spaced from said one end of each of said torsion elements.

15. The structure according to claim 14 wherein one of said torsion elements and its corresponding constant moment beam element are composed of a single piece of material bent in the shape of an L.

16. The structure according to claim 14 wherein said two torsion elements and said constant moment beam element are bent out of a single piece of material.

17. The structure according to claim 16 wherein said single piece of material has an oblong cross-section.

18. The structure according to claim 16 wherein said single piece of material has a uniform cross-sectional area substantially throughout its length.

19. The structure according to claim 14 wherein at least one of said connecting means in said torsion spring unit comprises a flange bent at the end of its said torsion element.

20. The structure according to claim 14 wherein at least one of said connecting means in said torsion spring unit includes means for adjusting the torsion in its said torsion element relative to the member to which it is attached.

21. The structure according to claim 14 wherein the torsional resistance of said torsion element is such that the torque in one torsion element is equal to the torque in the other torsion element when said unit is restricting the movement between said members.

22. The structure according to claim 14 wherein one torsion element develops less twist than the other, and wherein the distance of one torsion element from said axis is greater than the distance from said axis to the other torsion element.

23. The structure according to claim 14 wherein said torsion spring unit comprises a pair of U-shaped elements with their bases connected together to form said constant moment beam element and their legs aligned to form said torsion elements.

24. The structure according to claim 14 wherein each of said torsion elements has substantially the same polar moment of inertia.

25. The structure according to claim 14 wherein said torsion elements extend in the same direction from said constant moment beam element.

26. The structure according to claim 14 wherein said torsion elements extend on both sides of said constant moment beam element.

27. The structure according to claim 14 wherein said torsion elements extend in different directions from said constant moment beam element.

28. In a vehicle having a supporting frame and a member pivotally attached to said frame and movable relative to said frame about a single axis, a torsion spring unit straddling said axis comprising: first and second elongated torsion elements located in the same plane with said axis between the extremes of relative movement between said frame and said member, said extremes being 45° each side of said plane, one of said torsion elements having one of its ends connected to said frame and the other of said torsion elements having one of its ends connected to said member, and a constant moment beam element disposed transversely to said axis and rigidly connected to and spaced from said one end of each of said torsion elements.

References Cited in the file of this patent

UNITED STATES PATENTS

| 167,888 | Fredenburgh | Sept. 21, 1875 |
| 1,972,014 | Fraser | Aug. 28, 1934 |
| 2,852,269 | Gaines | Sept. 16, 1958 |
| 2,892,623 | Stoll | June 30, 1959 |